United States Patent [19]

Watanabe

[11] 4,203,140
[45] May 13, 1980

[54] HELICAL SCAN VTR WITH DEFLECTABLE HEAD

[75] Inventor: Yoshimi Watanabe, Yokohama, Japan

[73] Assignee: Sony Corporation, Tokyo, Japan

[21] Appl. No.: 845,558

[22] Filed: Oct. 26, 1977

Related U.S. Application Data

[63] Continuation of Ser. No. 635,139, Nov. 25, 1976, abandoned.

[30] Foreign Application Priority Data

Nov. 26, 1974 [JP] Japan .................. 49-136554

[51] Int. Cl.² ........................................... G11B 21/10
[52] U.S. Cl. ......................................... 360/77; 360/75; 360/70; 360/109
[58] Field of Search ................ 360/77, 76, 75, 70, 360/109, 107; 358/127; 179/100.3 V; 310/314, 331

[56] References Cited

U.S. PATENT DOCUMENTS

| | | | |
|---|---|---|---|
| 3,051,797 | 8/1962 | Johnson | 360/76 |
| 3,235,670 | 2/1966 | Kihara | 360/70 |
| 3,271,622 | 9/1966 | Malagodi | 310/331 |
| 3,526,726 | 9/1970 | Corbett | 360/76 |
| 3,588,378 | 6/1971 | Protas | 360/85 |
| 3,697,676 | 10/1972 | Protas | 360/10 |
| 3,706,861 | 12/1972 | Giel | 360/75 |
| 3,764,755 | 10/1973 | Yamashita | 360/70 |
| 3,787,616 | 1/1974 | Falk | 360/36 |
| 3,821,467 | 6/1974 | Iketaki | 360/70 |
| 4,080,636 | 3/1978 | Ravizza | 360/77 |
| 4,099,211 | 7/1978 | Hathaway | 360/76 |
| 4,151,569 | 4/1979 | Hathaway | 360/109 |

FOREIGN PATENT DOCUMENTS

| | | | |
|---|---|---|---|
| 48-38102 | 6/1973 | Japan | 360/77 |
| 49-9919 | 1/1974 | Japan | 360/77 |
| 49-84617 | 8/1974 | Japan | 360/77 |
| 50-137523 | 10/1975 | Japan | 360/77 |

Primary Examiner—Daryl W. Cook
Assistant Examiner—Alan Faber
Attorney, Agent, or Firm—Lewis H. Eslinger; Alvin Sinderbrand

[57] ABSTRACT

A tracking control system used in video reproducing apparatus to keep the signal head on the parallel recorded tracks in spite of speed deviations of the recording medium has a bi-morph leaf to support the head. The bi-morph leaf includes piezo-electric material to which a control voltage can be applied to deform the piezo-electric material to the extent necessary to deflect the leaf in the proper direction and to the proper extent necessary to keep the head mounted on the leaf alignment with the correct track section. When the leaf reaches its maximum permissible deflection, the control voltage is reversed to shift the head in the opposite direction. In so doing the head either skips a track section, if the recording medium is moving too fast, or repeats playback of a section, if the medium is moving too slowly. If the apparatus is reproducing magnetically recorded signals by means of two heads mounted on separate bi-morph leaves to play back alternate track sections, the control voltages can be applied to the leaves to shift each of the heads in the direction of its gap length during an interval when it is not being used to play back a track.

6 Claims, 25 Drawing Figures

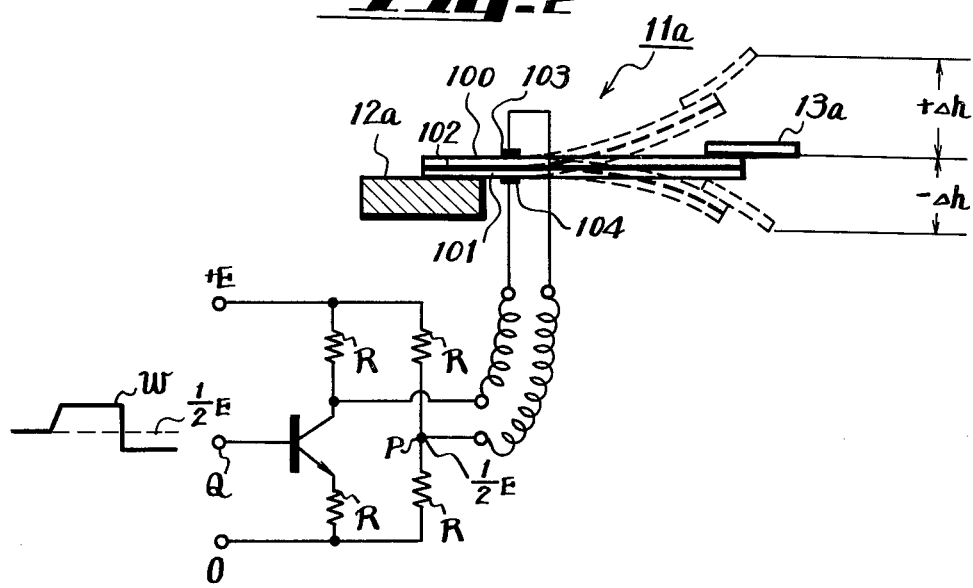
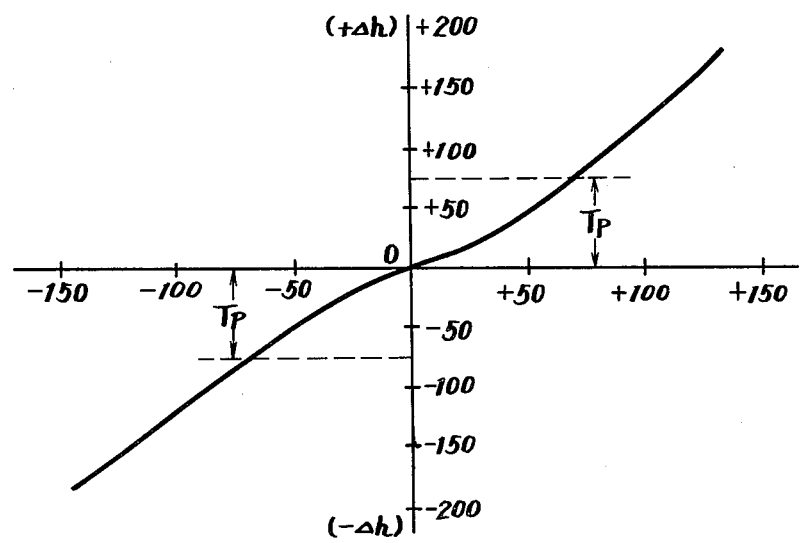

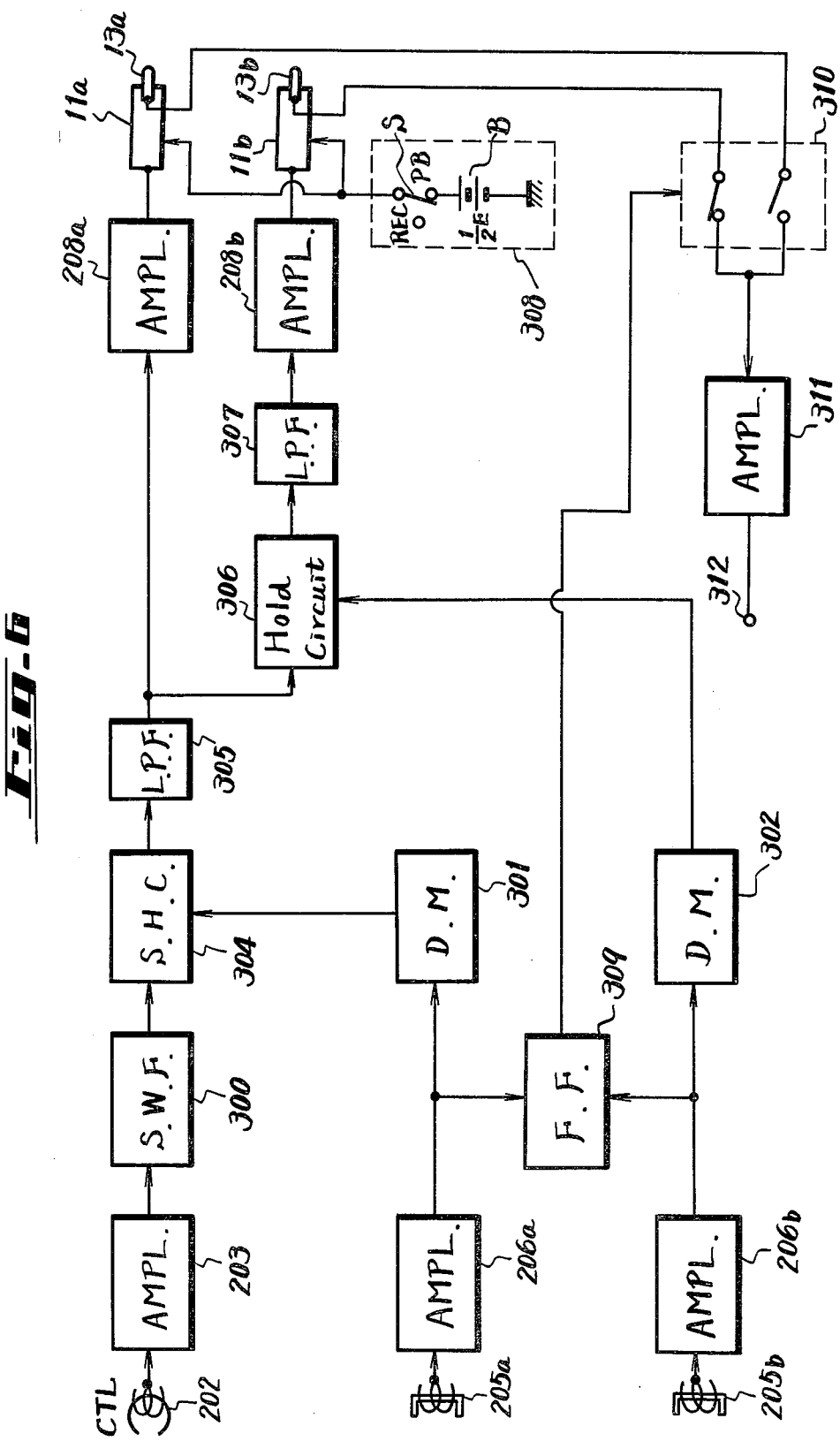

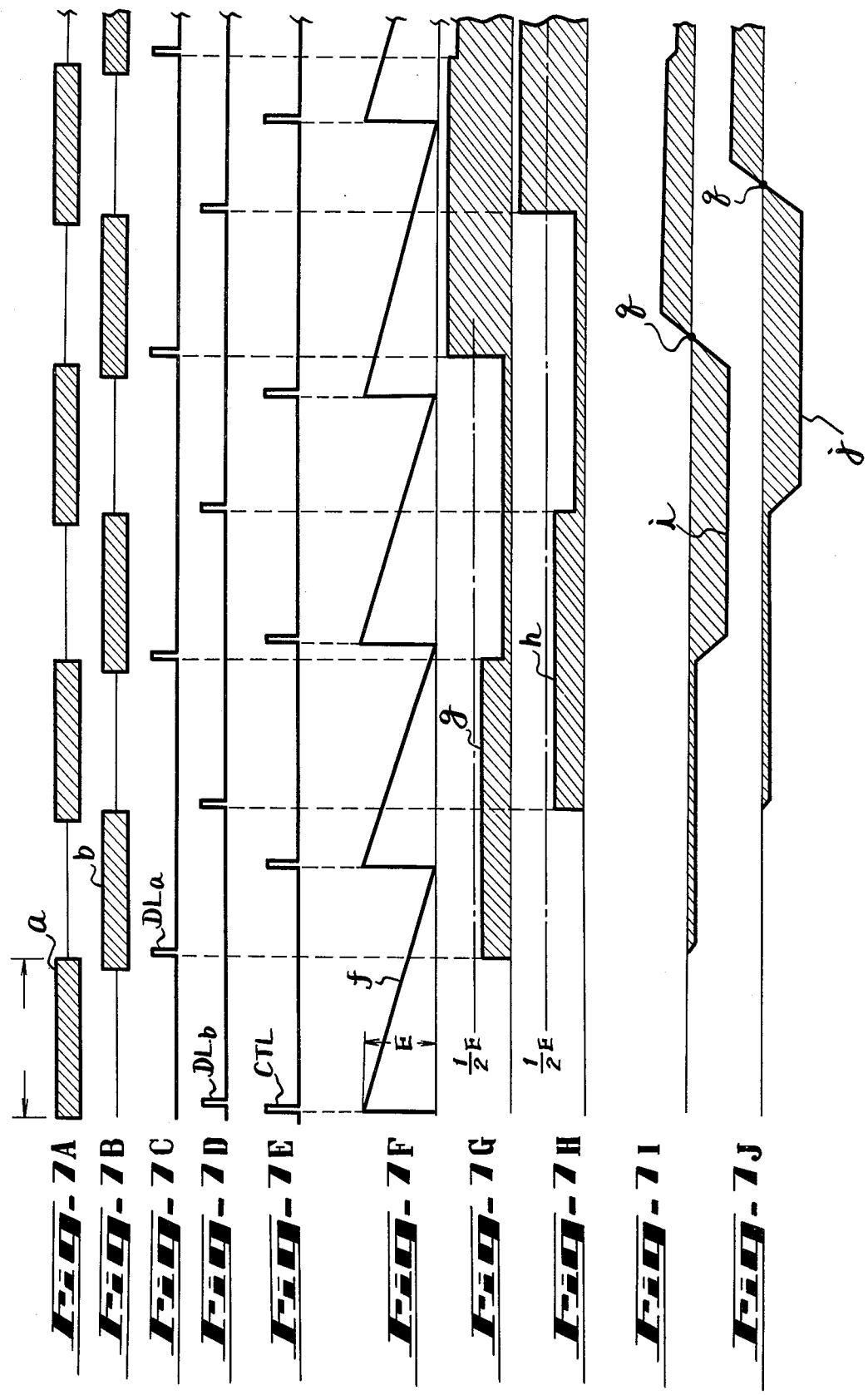

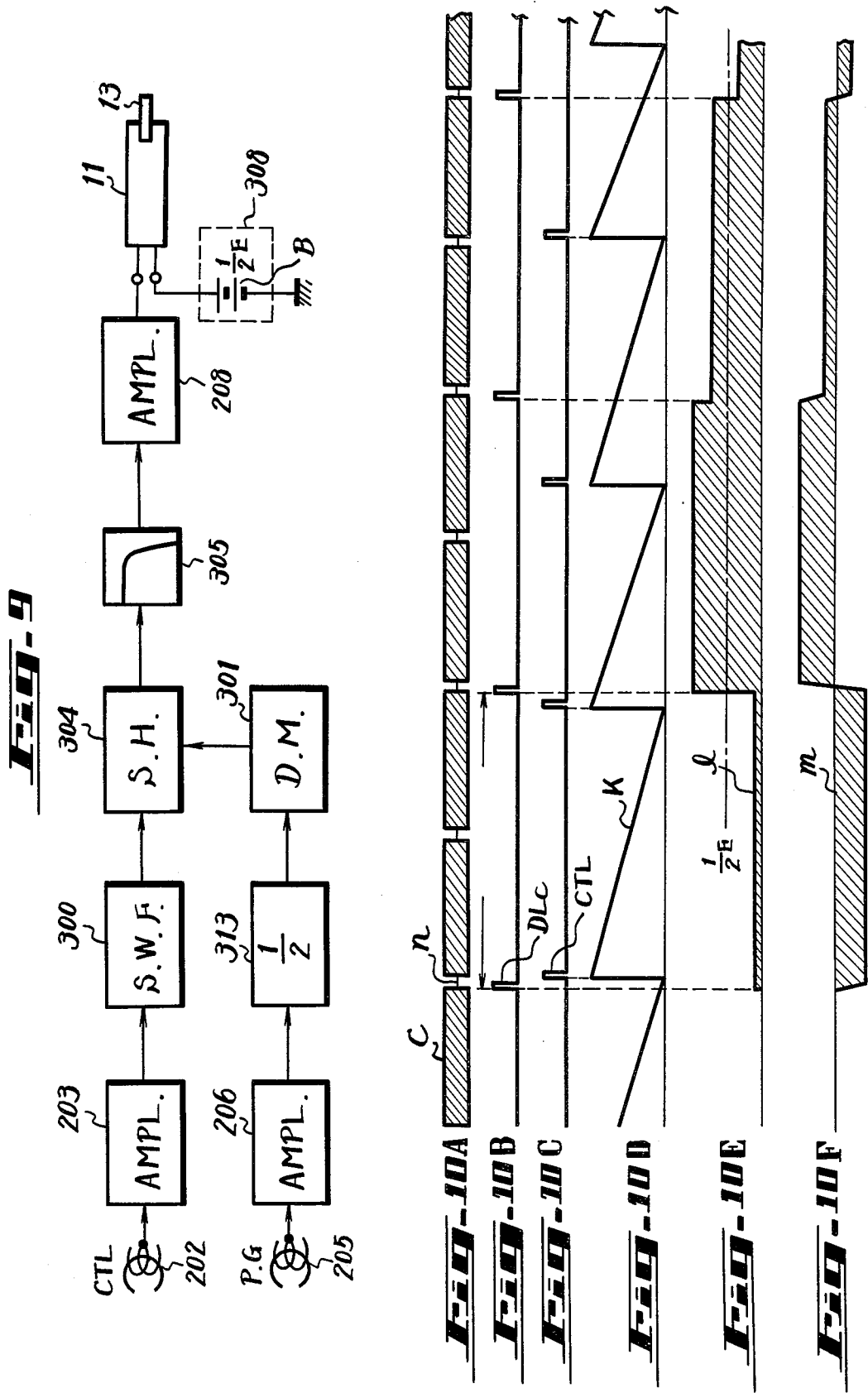

HELICAL SCAN VTR WITH DEFLECTABLE HEAD

This is a continuation of application Ser. No. 635,139, filed Nov. 25, 1976, now abandoned.

BACKGROUND OF THE INVENTION

1. Field of the Invention

The present invention relates generally to a system for eliminating tracking errors in reproducing recorded video signals. More particularly, the invention is directed to a video signal reproducing device using a piezo-ceramic material in the playback head support to compensate for tracking errors.

2. The Prior Art

In video tape recorders video signals are recorded on magnetic tape in a series of parallel magnetic tracks at a predetermined slant angle to the longitudinal direction of the tape. When the tape is run through a playback machine to reproduce the signals, a tracking servo system is employed to make the magnetic head trace, or scan, the recorded tracks correctly. With such a tracking servo system, the rotating speed of a rotary head drum having recording and reproducing heads therein is compared with the longitudinal speed of the tape to generate a signal to control the rotating speed of the rotary head drum, or the longitudinal speed of the magnetic tape, or both. Braking devices are commonly used to control the capstan motor that determines the longitudinal speed of the tape and to control the rate of rotation of the rotary head drum motor. The amount of braking force that must be used makes it necessary to provide a power amplifier to operate the brake devices. This in turn, requires a suitable power source, and the size of the video tape recorder (VTR) must, therefore, be large.

U.S. Pat. No. 3,787,616 describes means for correlating the position of a magnetic playback head longitudinally along a track on which video signals are recorded. The head is supported on a bi-morph leaf that includes piezo-electric sections responsive to control voltages to bend, or deflect, the leaf and thus move the head longitudinally with respect to the track to follow variations in the longitudinal speed of the track. However, the apparatus makes no provision for correction of an error due to a continuing inaccurate speed of the tape which would eventually cause the bi-morph leaf to be bent to its maximum limit, nor does it provide for correction of the tracking of skewed tracks typical of video tape recordings.

SUMMARY OF THE INVENTION

According to the present invention, a system for reproducing a video signal is provided which is convenient for use in a simple VTR and can apply a safe tracking servo control to correct the position of a magnetic head transverse the track and achieve accurate tracking of skewed tracks as well as accurate control in spite of continuously inaccurate speed of the recording medium. Furthermore, this invention results in accurate tracking without controlling the speed of the reproducing motor and, therefore, without requiring large electric power consumption. To control the position of magnetic heads, in the present invention, a piezo-ceramic material such as a bi-morph leaf is employed on which a magnetic head chip is mounted. The piezo-ceramic material is supplied with a predetermined control voltage to be deflected so as to control the position of the magnetic head transversely with respect to the longitudinal direction of the track. The control voltage can produce a sudden, relatively large shift in the head position once the head is at or near the position corresponding to maximum deflection of the leaf. This allows a track to be skipped if the medium is moving too fast or to be played back twice if the medium is moving too slowly and continues such incorrect fast or slow movement too long.

Further, with the system of the present invention it is not necessary that the motor for driving the rotary head drum be different from that for driving the capstan; one motor is enough for driving the both.

Accordingly, it is an object of the present invention to provide a system for improved tracking control in reproducing a video signal in a simple VTR.

It is another object of the present invention to provide an improvement in the tracking servo system of a simple VTR in which the signal recorded in a series of skewed tracks.

It is a further object of the invention to provide an improved servo system in which a piezo-ceramic material is used as a tracking servo device.

It is a still further object of the invention to provide a system for reproducing a video signal for use in a VTR that uses one motor for driving both the capstan and rotary head drum thereof.

Other objects, features, and advantages of the present invention will be apparent from the following description taken in conjunction with the accompanying drawings.

BRIEF DESCRIPTION OF THE DRAWINGS

FIG. 2 is an enlarged drawing of the head assembly of FIGS. 1A and 1B together with its control circuitry.

FIG. 3 is a graph of the displacement of the head assembly of FIG. 2 in response to the control voltage.

FIG. 6 is a block diagram showing a practical example of the tracking control circuit according to the invention.

FIGS. 7A to 7J are time charts used for explaining the operation of the tracking control circuit in FIG. 6.

FIG. 9 is a block diagram of a tracking control circuit used for the embodiment in FIG. 8.

FIG. 10A to 10F are time charts for explaining the circuit in FIG. 9.

DESCRIPTION OF THE PREFERRED EMBODIMENTS

Figure 1A:
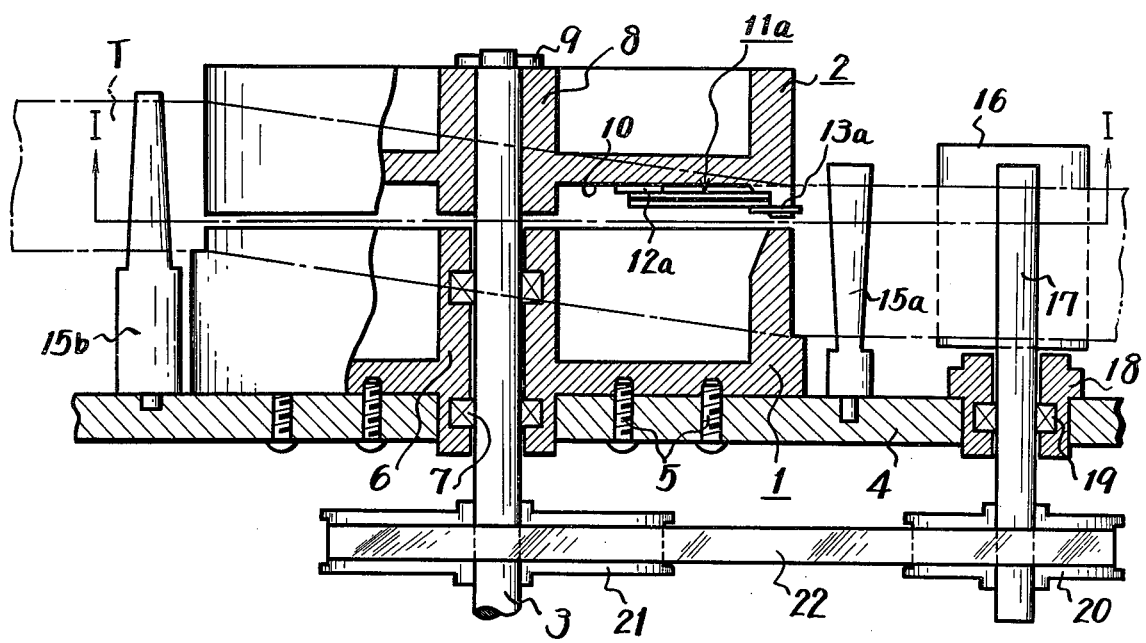
FIG. 1A shows partially in cross-section, the head drum assembly of a VTR including a part of a head assembly for one embodiment of the system for reproducing a video signal according to the present invention.
Figure 1B:
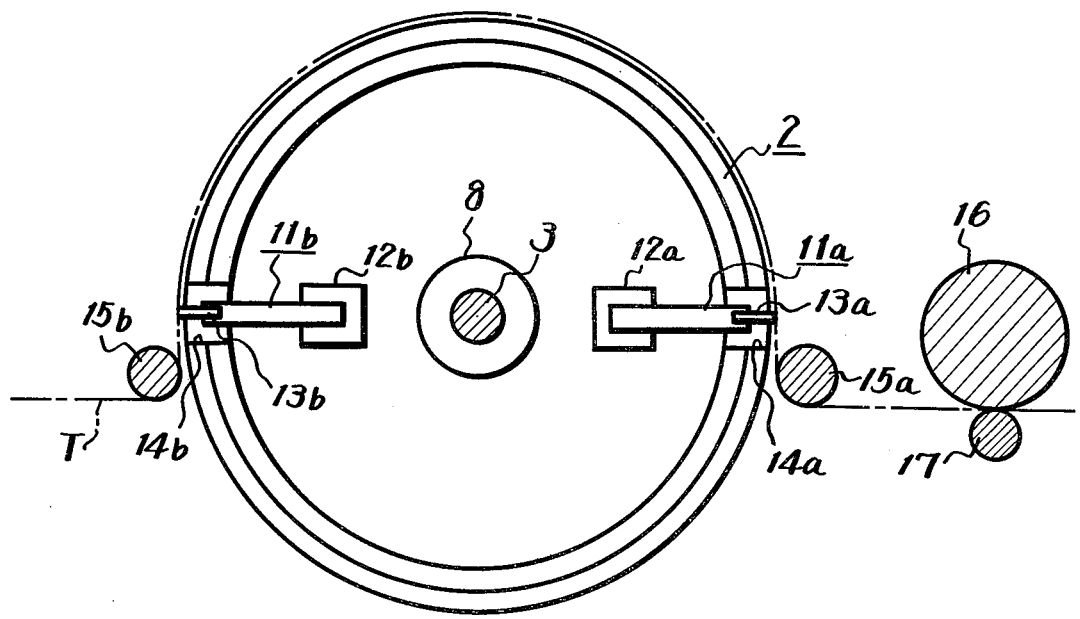
FIG. 1B is a cross-sectional view taken on the line I—I in FIG. 1A.

FIGS. 1A and 1B show a rotary head drum assembly and a tape drive assembly of a two head helical type VTR, constructed according to the present invention. In this VTR, the height, or position, of magnetic heads for recording and reproducing a video signal, or for reproducing a previously recorded video signal, can be changed arbitrarily.

The apparatus in FIG. 1A includes a stationary lower drum 1 and a rotatable upper drum 2 supported on a rotatable shaft 3. The lower end of the shaft 3 extends through a chassis 4 of the VTR and is directly coupled to a drum motor (not shown). The lower drum 1 is affixed to the chassis 4 by bolts 5. A cylinder shaft 6 of the lower drum 1 has bearings 7 within it to provide rotatable support for the shaft 3. The shaft 3 extends through a hub 8 of the upper drum 2, which is held on the shaft 3 by a nut 9 so that the upper drum 2 is rotated by the shaft 3 when the latter is driven by the motor. On the bottom surface 10 of the upper drum 2 are mounted two support leaves, each made of a piezo-ceramic material in a structure known as a bi-morph leaf. Only one support leaf 11a and its support member 12a are shown in FIG. 1A but a symmetrically located lead 11b and support member 12b are shown in FIG. 1B. Each of the bi-morph leaves 11a and 11b includes two piezo-ceramic plates bonded to the upper and lower surfaces of a metal plate made of, for example, stainless steel or the like. The piezo-ceramic material may be Pb(Zr-Ti)O$_3$. An electrode is formed on the free surface of each of the bi-morph leaves 11a and 11b, and in use, a predetermined voltage is applied across these electrodes to give a mechanical bias thereto to provide an initial deflection. Magnetic head chips 13a and 13b are mounted on the free ends of the bi-morph leaves 11a and 11b, respectively, and extend outwardly from recesses 14a and 14b formed in the upper drum 2. A magnetic tape T is wrapped around the outer peripheries of the upper drum 2 and lower drum 1 over an arc of about 180° and guided by tape guides 15a and 15b shown in FIG. 1B. The magnetic tape T is gripped and moved longitudinally by the cooperation of a pinch roller 16 and a capstan 17. The capstan is rotatably supported by a bearing 19 which is embedded in a boss 18 inserted into the chassis 4. In the apparatus shown in FIGS. 1A and 1B, the capstan 17 has attached thereto a pulley 20 at its lower end portion, contrary to prior art capstans. The pulley 20 is linked to the motor shaft 3 by a belt 22 stretched between the pulley 20 and a pulley 21 attached to the motor shaft 3, and no independent servo system is provided for the capstan 17.

FIG. 2 shows, in greater detail, one of the bi-morph leaves 11a in FIGS. 1A and 1B. FIG. 2 also shows a circuit for producing and controlling the mechanically biased or deflected condition of the bi-morph leaf 11a. As previously described, the bi-morph leaf 11a consists of two plates 100, 101 made of piezo-ceramic material, the reinforcing plate 102 made of stainless steel with the plates 100, 101 on its opposing surfaces, and the electrodes 103, 104 formed on the free surfaces of the plates 100, 101. Reference letters R indicate impedances, reference letter P indicates the connection point of series impedances R, reference letter Q indicates an input terminal to which a control voltage w is supplied, and reference letters O and +E indicate negative and positive voltage source terminals, respectively.

FIG. 3 is a graph showing the characteristic of the bi-morph leaf 11a in which abscissa represents the voltage applied across the electrodes 103, 104 in volts, the ordinate represents the displacement ±Δh of the head chip 13a caused by the distortion of the bi-morph leaf 11a by the bias applied thereto, and $T_P$ shows one pitch length (corresponding to one field) of the recorded track on the tape T of an ordinary VTR, respectively.

Turning back to FIG. 1A, when a video signal is recorded on the tape T by a recording head, which could be the head 11a, the vertical position of the head is maintained substantially constant, and a control signal (CTL pulse) that can be correlated with the tape position at the beginning of each frame is recorded on the tape T as in the ordinary case.

When the video signal is reproduced, the upper head drum 2 and the capstan 17 are driven or rotated by the same motor. In this case, however, due to the sliding and friction of the tape T upon the tape transportation, the rotational speed and the rotary phase of the head drum 2 do not always coincide with the longitudinal speed of the tape T. As a result, the head cannot correctly trace the recorded track on the tape T.

If it is possible to displace or move the vertical position of the head at least two times by one pitch length of video tracks, the head can correctly trace out the tracks without controlling both the tape speed and the rotational speed of the head drum.

The relation between the signal reproducing heads and the recorded tracks will be now described with reference to FIG. 4. When the longitudinal speed of the tape T travelling in the direction S increases somewhat, the rate at which the control pulses CTL recorded on the tape are reproduced increases and the heads 13a and 13b track an increasingly higher portion of the recorded track, gradually causing a tracking error, or deviation. If the vertical position of heads is changed by deflection of the bi-morph leaves 11a and 11b, which support the heads as shown in FIG. 1, in response to a tracking error signal, the heads can follow the shifting track positions to keep their proper tracking relationship. However, if the compensation for the mis-tracking has to be continued for a relatively long time, the bi-morph leaves eventually arrive at their position of maximum permissible deflection. The vertical position of the heads cannot increase beyond that position. As a result, when the heads arrive at their maximum permissible deflection, they are lowered rapidly by two recording tracks widths. In the case of a VTR using only one head, that head is lowered by one track width. If the tape speed is high continuously, the above operation may be repeated periodically. If the tape speed is lower than the correct speed, a similar operation can be done to shift the heads in the opposite direction to achieve compensation for mistracking.

In the case of a two-head VTR, when one head is reproducing the recorded signal, the other head is idle. Therefore, it is easy to change the height of the latter head by two track widths, corresponding to one frame, in the idle interval, which is about 1/60th of a second long.

Figure 4:
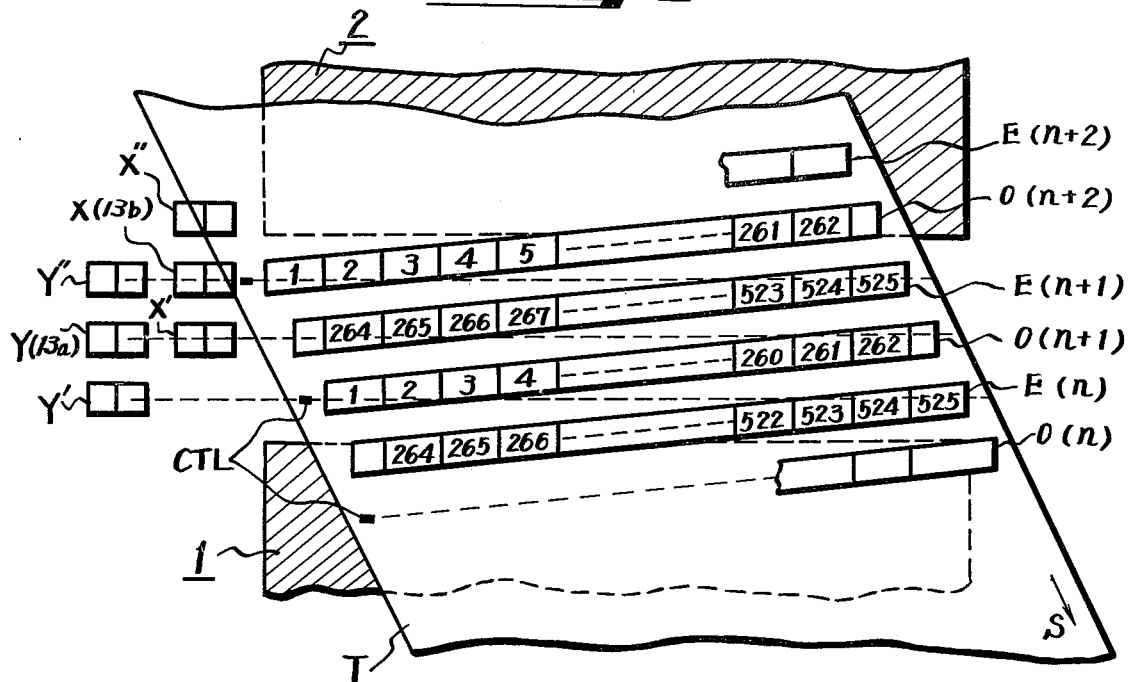
FIG. 4 is a diagram used for explaining the operation of the tracking control of the present invention.

FIG. 4 is used to illustrate a condition in which the longitudinal speed of the tape T during reproduction is different from the recording speed. The head 13a is shown in a position Y that corresponds to the position during recording. The position Y' is the lowest position to which the head is displaced during reproduction, and the position Y" is the highest position to which the head is displaced during reproduction.

When the tape speed during reproduction is higher than the recording speed, the tracking-shift sooner or later, depending on the error in speed, causes maximum permissible deflection to the position Y'. The head must then shift to the position corresponding to the next track to be traced. This causes no loss of synchronization because there is no sudden displacement of horizontal synchronization. In other words, it is sufficient that after the head at the position Y' has finished its scanning on track O(n+1), which contains information for one field, the head is shifted to the position Y" to scan track O(n+3), which would be located next above track E(n+2), without scanning track O(n+2). It will be recognised that the head 13a scans only alternate tracks.

Similarly, it is sufficient that the other head 13b, which has been displaced from its normal position X to the position X', where it traces track E(n+1), be displaced to the position X" to track track E(n+3), which would be above the location of track O(n+3). By this shift, a picture of one frame is skipped. However, in practice, there will be no trouble because only one frame recorded on tracks O(n+2) and E(n+2) is skipped.

Similarly, when the tape speed during playback is lower than the recording speed, the heads are controlled to trace the same track twice. For example, the head 13a that has been displaced to the position Y" is shifted to the position Y' to trace the track O(n+2) twice, and then head 13b is shifted from the position X" to the position X' to trace the track E(n+2) twice.

Figure 5:
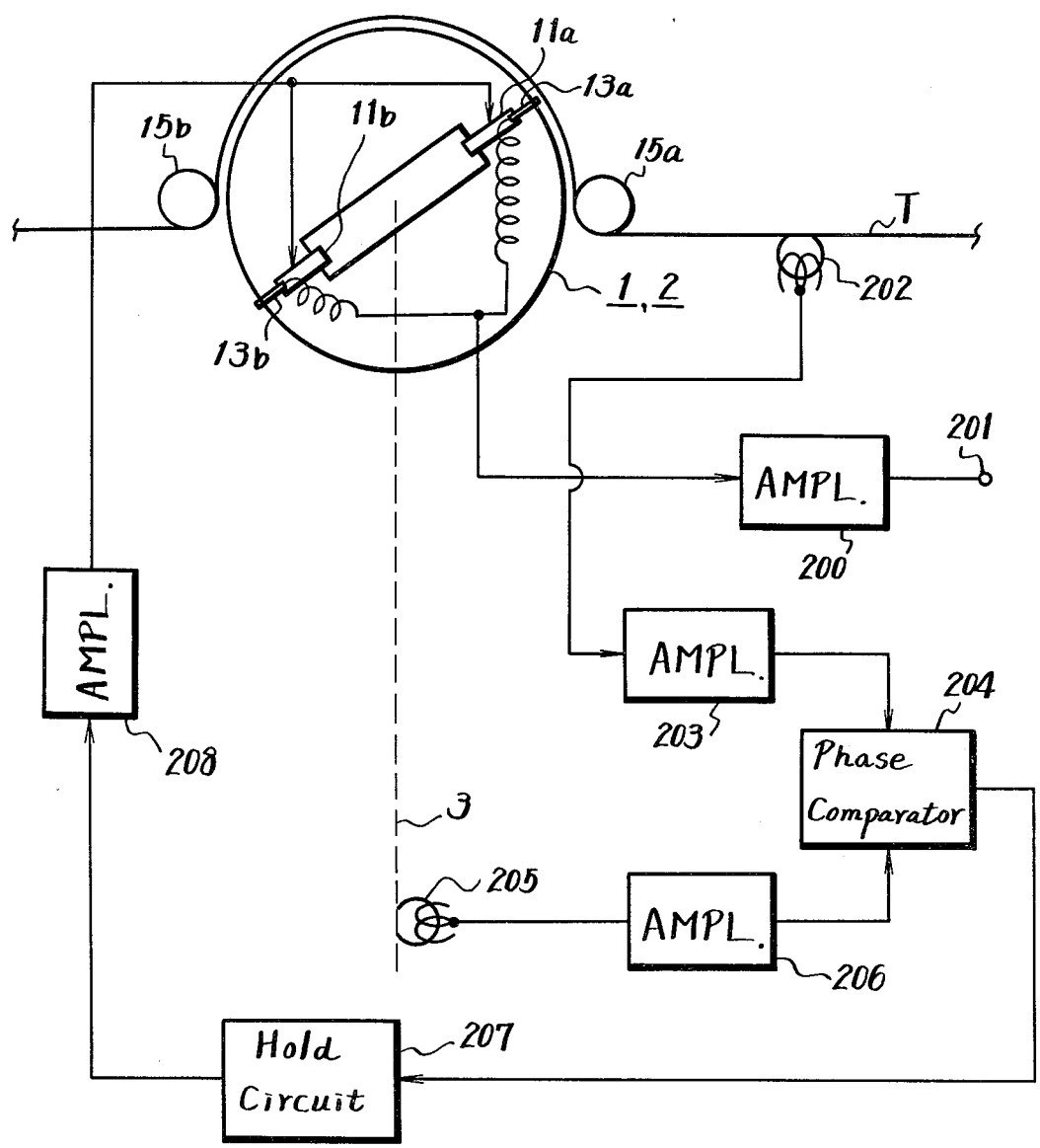
FIG. 5 is a block diagram of the basic tracking control circuit according to the invention.

FIG. 5 shows a circuit for achieving the tracking servo operation of the head assembly as described above. On the tape T one field of the video signal is recorded, for example, as one magnetically recorded track, and one control pulse CTL is recorded per frame for carrying out the reproduction tracking servo operation along the longitudinal direction of the tape T. The tape T is wrapped around the lower and upper drums 1 and 2 over an arc of about 180° and is moved longitudinally at a predetermined speed. The reproduced signals from the heads 13a and 13b are both connected to a reproducing circuit 200 which reproduces the video signal and delivers it to an output terminal 201.

A magnetic head 202 is provided in contact with the tape T to reproduce the control pulses CTL. The control pulses reproduced by the head 202 are fed through an amplifier 203 to a phase comparator 204. A pulse generator device 205 is provided in connection with the rotary shaft 3 of the upper drum 2 which generates, for example, a pulse per one revolution of the shaft 3. The pulses generated by the pulse generator 205 are fed to the phase comparator 204 through an amplifier 206 to be phase-compared with the control pulse CTL from the head 202. The output from the phase comparator 204 is applied through a sample-and-hold circuit 207, which includes a smoothing circuit, and an amplifier 208 to the piezo-ceramic elements of bi-morph leaves 11a and 11b which support the heads 13a and 13b, respectively. In this case, the distortion direction of the bi-morph leaves 11a and 11b is selected such that the heads 13a and 13b are displaced in the transverse direction of the magnetic track and both heads are shifted in the same direction.

Accordingly, any shift between the movement of the tape T and the rotary phase of the upper drum 2 causes a tracking error by the heads 13a and 13b. When that occurs, the phase comparator 204 produces an output which is applied to the bi-morph leaves 11a and 11b to deflect them. Thus, the heads 13a and 13b supported by the bi-morph leaves 11a and 11b are displaced to trace the video tracks, which means that the tracking servo operation is carried out.

FIG. 6 is a block diagram showing the reproducing system of the invention in detail. Components that are the same as those in FIG. 5 are designated by the same reference characters. The embodiment of FIG. 6 will be described with reference to the graphs in FIGS. 7A to 7J. The control pulse CTL of 30 Hz (FIG. 7E) reproduced by the head 202 is applied through the amplifier 203 to a sawtooth wave forming circuit 300 to produce an output signal f (FIG. 7F) to be applied to a sample-and-hold circuit 304. The sample-and-hold circuit 304 is also supplied with a pulse DLa of 30 Hz (FIG. 7C) as the sampling pulse to operate in a manner which will be described later. Pulse generators 205a and 205b are magnetically coupled to the shaft 3 of the drum 2 so that each of the pulse generators 205a and 205b produces one pulse per one revolution of the rotary upper drum 2. In this case, the pulse generators 205a and 205b are located on opposite sides of the shaft 3 as in the prior art. Further, the timing of the pulse generators 205a and 205b is so selected that the pulse generator 205a produces an output pulse during the time period within which the head 13a is not reproducing a signal, while the other pulse generator 205b produces an output pulse during the time period within which the head 13b is not reproducing a signal. The output pulses from the pulse generators 205a and 205b are passed through the respective amplifiers 206a and 205b to a pair of delay multivibrators 301 and 302, respectively, to be delayed by a predetermined time. The delay multivibrators 301 and 302 produce output pulses DLa and DLb (FIG. 7C and 7D), respectively, and the delay time of the multivibrators 301 and 302 is determined so that the vertical positions of the heads 13a and 13b, which are brought to their rest state after they are switched, can be immediately adjusted. For example, the pulses obtained from the delay multivibrators 301 and 302 are delayed by 5 to 10 H (H being one horizontal trace period) after the switching of the heads. In order to avoid having any vibration of the bi-morph leaf that supports the head that is not reproducing a signal be mechanically transmitted to the other head which is reproducing a signal, the adjustment of the vertical position of the momentarily inactive head is started rapidly but is carried out gradually within the idle interval of approximately 1/60 second. After the vibration of the bi-morph leaf supporting the idle head has stopped completely, the idle head is again made operative.

The sample-and-hold circuit 304 samples the sawtooth wave f shown in FIG. 7F from the sawtooth wave forming circuit 300 in response to each of the sampling pulses DLa shown in FIG. 7C and then holds the sampled voltage. The output from the sampling hold circuit 304 is applied to a low pass filter 305, if necessary, which produces a voltage g in FIG. 7C. The output voltage g from the low pass filter 305 is supplied through an amplifier 208a to the bi-morph leaf 11a. The output voltage g is also supplied to a sample-and-hold circuit 306, which is supplied with sampling pulses DLb from the delay multivibrator 302, so that the sample-and-hold circuit 306 samples the voltage g with the pulse DLb and then supplies the sampled voltage to a low pass filter 307, if necessary. The low pass filter 307 produces an output voltage h shown in FIG. 7H which is applied through an amplifier 208b to the bi-morph leaf 13b. Since the voltages g and h which are fed to the bi-morph leaves 11a and 11b have the same amplitude, the deflection of the leaves 11a and 11b is the same and hence the heads 13a and 13b are held at substantially the same vertical position. Further, since two sample-and-hold circuits 304 and 306 are provided, the respective heads can be shifted to the necessary positions during their respective idle positions.

In practice, the bi-morph leaves 11a and 11b are supplied with an initial bias voltage, for example E/2 (E being the maximum voltage of the sawtooth wave f) so that whether the control voltages, which are then outputs of the amplifiers 208a and 208b, are greater or smaller than E/2, the bi-morph leaves 11a and 11b can be deflected to displace the heads 13a and 13b upwardly or downwardly.

By way of example, in FIG. 2 a voltage at the connection point P between the two resistors of equal resistance R is selected as E/2 to deflect the bi-morph leaf 11a and hence to displace the height of the head 13a by $+\Delta h$ or $-\Delta h$ in response to whether the voltage at the input terminal Q supplied with the control signal w is greater or smaller than E/2. Accordingly, if it is assumed that E/2 is the center voltage of the voltages g and h in FIGS. 7G and 7F, when the voltages g and h are supplied to the bi-morph leaves 11a and 11b, the direction and amount of deflection, i.e. the vertical positions of the heads 13a and 13b can be shown by curves i and j in FIGS. 7I and 7J, respectively. In fact, the response of the bi-morph leaves 11a and 11b to the voltages applied thereto are as shown by the curves i and j; the leaves bend upwardly and downwardly during the positively and negatively sloping parts, respectively, of these curves. In FIGS. 7I and 7J, points q show when the direction of the deflection of the bi-morph leaves 11a and 11b is changed.

In FIG. 6, a dotted line block 308 designates a circuit to produce a bias voltage having a value E/2. This bias voltage circuit consists of a battery B having a voltage E/2 and a switch $S_1$ that switches according to the recording and reproducing modes indicated on the fixed terminals REC and PB, respectively.

Further, in the circuit in FIG. 6, the outputs of the pulse generators 205a and 205b are supplied through the amplifiers 206a and 206b to a flip-flop circuit 309 the output of which is applied to a switching circuit 310 for selecting which of the heads 13a and 13b is to deliver its output signal through an amplifier 311 to an output terminal 312. The output signals from the heads 13a and 13b are indicated as a and b in FIGS. 7A and 7B. In this case, the overlap periods of the outputs a and b from the heads 13a and 13b which are switched by the output from the flip-flop circuit 309 are selected to be approximately 10 H.

Figure 8:
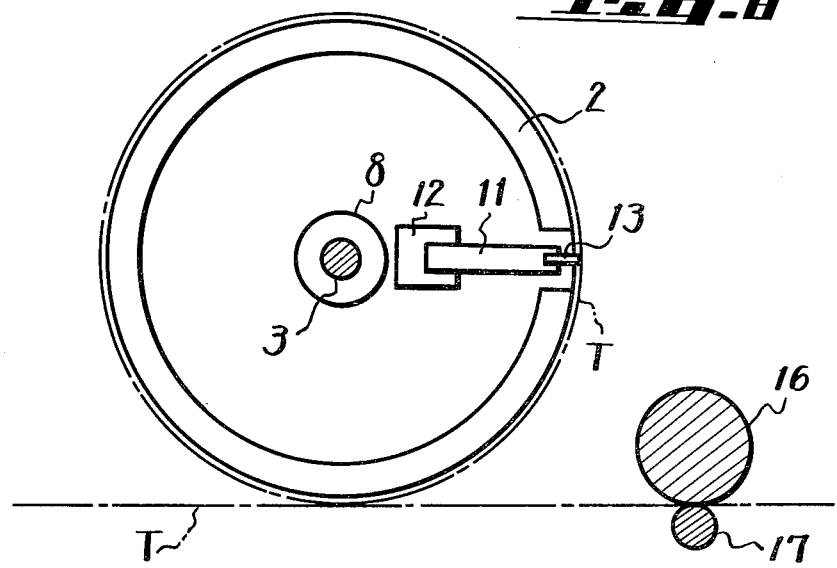
FIG. 8 shows the head drum assembly of another embodiment of the present invention.

FIG. 8 shows another embodiment of the invention in which the elements common to those of FIG. 1B are identified by the same reference characters. The embodiment of FIG. 8 shows a single-head type VTR in which the tape T is wrapped entirely around the upper drum 2. In this example, the head is identified by numeral 13, the bi-morph leaf by numeral 11, and the support member by numeral 12. These elements are substantially the same in construction, operation and effect as the elements 13a, 13b, 11a, 11b, 12a and 12b in FIG. 1B so that their description will be omitted for the sake of brevity.

FIG. 9 shows an example of the tracking control circuit for the embodiment in FIG. 8. The circuit in FIG. 9 is substantially the same as that of FIG. 6 with the deletion of one of the heads, for example, head 13b and its associated elements. If the tape having recorded information to be reproduced by the circuit in FIG. 9 has one track per frame as does the tape T in FIG. 4, the shaft 3 in FIG. 8 must rotate at a speed of 60 r.p.s. The pulse generator 205 in FIG. 9 will therefore produce pulses at twice the frame repetition rate. As a result, a frequency dividing counter 313 that divides by 2 is connected between the amplifier 206 and the delay multivibrator 301 so that the sawtooth signal produced by the generator 300 will only be sampled 30 times per second.

FIGS. 10A to 10E show signals obtained at the respective parts of the circuit shown in FIG. 9. That is, FIG. 10A represents an output signal c of the head 13; FIG. 10B illustrates an output pulse DLc from the delay multivibrator 301; FIG. 10C shows the control pulses CTL; FIG. 10D shows an output signal k from the sawtooth wave forming circuit 300; and FIG. 10E shows an output signal l from the low pass filter 305. FIG. 10F is not a signal waveform but a curve which shows the displacement amount and direction of the head 13, respectively.

In the case of a single-head type VTR, there is a short interval n where no signal appears at every field as shown in FIG. 10A. Any change in the vertical position of the head should take place within the period n.

Further, when the vertical position of a single-head VTR is shifted at the maximum deflection point of the bi-morph leaf, it is similar to the case of a two-head type VTR in that either one frame is skipped or is traced a second time, depending on whether the tape is moving too quickly or too slowly.

In the above embodiments of the present invention, bi-morph element or leaf is used as the piezo-ceramic material, but a mono-morph element can be employed as the piezo-ceramic element with the same effects.

The above description is given for the case in which tracking control is to be achieved, but it is also possible to control the distance that the heads project from the head drum, to control the arcuate distance between two heads on the head drum to overlap the control signal for jitter correction, and so on. In the case of correcting jitter, the bi-morph leaf, and hence the head, is displaced in the lengthwise direction of the recorded track.

If, in the case of a two-head VTR, the bi-morph leaves are employed and are deflected to twist the heads so as to provide a predetermined azimuth angle between the gaps of two heads, it can be easily done.

The above description is made for the case in which magnetic tape is employed as the recording medium, but the present invention can be similarly applied to the reproduction of signals recorded on a magnetic disc as the recording medium with concentric tracks formed thereon.

Further, in the above embodiments, the recorded signal on the recording medium is reproduced by a magnetic head, but the present invention can be applied to the apparatus in which signals are recorded on the recording medium as, for example, optical or capacitance variations.

It will be apparent that many modifications and variations could be effected by one skilled in the art without departing from the spirit or scope of the novel concepts of the present invention.

What is claimed is:

1. Apparatus for reproducing video signals recorded on a recording medium in successive parallel tracks which are skewed relative to a direction of movement of said medium, said apparatus comprising:
   signal transducer means repeatedly scanning said recording medium in a direction generally along said tracks for reproducing the video signals from said successive tracks upon said movement of the medium;

controllable support means movably supporting said signal transducer means and being responsive to variations in a tracking control signal for displacing said transducer means from a neutral position in first and second opposed directions respectively extending transversely with respect to the tracks, said support means having predetermined limits of its displacement of said transducer means in said first and second directions from said neutral position; and control signal generating means for providing said tracking control signal and being normally operative, upon mistracking of said transducer means relative to a track, to vary said tracking control signal in the sense for causing said support means to displace said transducer means in a respective one of said directions for restoring correct tracking of said track by said transducer means, said control signal generating means including means operative upon displacement of said transducer means to said limit thereof in one of said directions for varying said tracking control signal in the sense for causing said support means to displace said transducer means in the other of said directions substantially to the respective limit thereof.

2. The apparatus according to claim 1; in which the recorded video signals include vertical blanking periods, and said control signal generating means includes means to vary said tracking control signal during said blanking periods.

3. The apparatus according to claim 1; in which said transducer means includes a plurality of heads alternatively scanning said recording medium so that each of said heads has alternating operative and inoperative periods for reproducing the video signals, said heads have respective controllable support means, and said control signal generating means includes means to vary said tracking control signal applied to each of said support means only during said inoperative period of the respective one of said heads.

4. The apparatus according to claim 2; in which, in at least certain of said vertical blanking periods, said tracking control signal is varied to cause stepwise movement of said signal transducer means through a maximum distance equal to a whole multiple of the pitch of said tracks.

5. The apparatus according to claim 4; in which said signal transducer means includes two signal transducer heads which alternately scan said successive tracks, each of said tracks has a field of said video signals recorded therein, and said maximum distance of the stepwise movement is twice said pitch of the tracks.

6. The apparatus according to claim 4; in which said signal transducer means includes a single head by which said tracks are scanned in succession, each of said tracks has a field of the video signals recorded therein, and said maximum distance of the stepwise movement is equal substantially to said pitch.

* * * * *